United States Patent
Kato et al.

(10) Patent No.: US 11,691,324 B2
(45) Date of Patent: Jul. 4, 2023

(54) INJECTION MOLDING DEVICE, INJECTION MOLDING METHOD, AND INJECTION MOLDING RESIN MATERIAL

(71) Applicant: MAZDA MOTOR CORPORATION, Hiroshima (JP)

(72) Inventors: Hidekazu Kato, Aki-gun (JP); Michihisa Iwamoto, Higashihiroshima (JP); Yasuhiro Tominaga, Uozu (JP); Takahiro Tanaka, Hiroshima (JP); Teruyuki Hamada, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 310 days.

(21) Appl. No.: 16/648,426

(22) PCT Filed: Mar. 30, 2018

(86) PCT No.: PCT/JP2018/013814
§ 371 (c)(1),
(2) Date: Mar. 18, 2020

(87) PCT Pub. No.: WO2019/187071
PCT Pub. Date: Oct. 3, 2019

(65) Prior Publication Data
US 2020/0238585 A1 Jul. 30, 2020

(51) Int. Cl.
| | | |
|---|---|---|
| *C08L 23/06* | (2006.01) | |
| *C08L 23/12* | (2006.01) | |
| *C08L 25/06* | (2006.01) | |
| *C08L 33/12* | (2006.01) | |
| *C08L 77/06* | (2006.01) | |
| *B29C 45/73* | (2006.01) | |
| *B29C 45/00* | (2006.01) | |
| *B29C 45/03* | (2006.01) | |
| *B29C 45/77* | (2006.01) | |
| *B29C 45/78* | (2006.01) | |
| *H05B 6/62* | (2006.01) | |
| *B29K 77/00* | (2006.01) | |

(52) U.S. Cl.
CPC .......... *B29C 45/73* (2013.01); *B29C 45/0001* (2013.01); *B29C 45/03* (2013.01); *B29C 45/77* (2013.01); *B29C 45/78* (2013.01); *C08L 23/06* (2013.01); *C08L 23/12* (2013.01); *C08L 25/06* (2013.01); *C08L 33/12* (2013.01); *C08L 77/06* (2013.01); *H05B 6/62* (2013.01); *B29C 2945/76498* (2013.01); *B29C 2945/76531* (2013.01); *B29K 2077/00* (2013.01)

(58) Field of Classification Search
CPC ..... B29C 33/06; B29C 33/08; B29C 45/0001; H05B 6/64
See application file for complete search history.

(56) References Cited

U.S. PATENT DOCUMENTS

| | | | | |
|---|---|---|---|---|
| 5,395,870 A | * | 3/1995 | Suzuki | .............. C08L 25/04 524/136 |
| 6,476,774 B1 | * | 11/2002 | Davidson | ............. H05K 1/0373 343/895 |
| 2005/0095444 A1 | * | 5/2005 | Tanaka | ................. B32B 37/153 428/480 |
| 2017/0050361 A1 | | 2/2017 | Kato et al. | |

FOREIGN PATENT DOCUMENTS

| | | |
|---|---|---|
| JP | 2000127175 A | 5/2000 |
| JP | 2003311799 A | 11/2003 |
| JP | 2003311800 A | 11/2003 |
| JP | 2009101602 A | 5/2009 |
| JP | 2014113699 A | 6/2014 |

OTHER PUBLICATIONS

International Search Report issued in PCT/JP2018/013814; dated May 15, 2018.
An Office Action mailed by China National Intellectual Property Administration dated Sep. 18, 2021 which corresponds to Chinese Patent Application No. 201880060434.7 and is related to U.S. Appl. No. 16/648,426 with English language Summary.

\* cited by examiner

*Primary Examiner* — Jeffrey C Mullis
(74) *Attorney, Agent, or Firm* — Studebaker & Brackett PC (57) ABSTRACT

An injection molding device includes an injection machine, a molding die, and a high frequency oscillation device. The injection machine injects a resin material containing a dielectric heat generating material while keeping fluidity by temperature control. The molding die includes a cavity being a channel of flow of the resin material, and a pair of electrodes, each of which faces the cavity, the pair of electrodes being disposed to sandwich the resin material therebetween in a direction crossing a direction of the flow. The high frequency oscillation device applies a high frequency alternate-current voltage to the pair of electrodes.

4 Claims, 9 Drawing Sheets

INJECTION MOLDING DEVICE, INJECTION MOLDING METHOD, AND INJECTION MOLDING RESIN MATERIAL

TECHNICAL FIELD

The present disclosure relates to an injection molding device, an injection molding method, and an injection molding resin material.

BACKGROUND ART

An injection molding device is a device for manufacturing a resin product by injecting a resin material having fluidity into a molding die, and solidifying the resin material filled in the molding die. Such an injection molding device has been widely used.

For example, Patent Literature 1 discloses an injection molding device which is provided with a resin melting device including a high frequency oscillator, and is configured to manufacture a resin product by injecting a resin material having fluidity in the resin melting device into a molding die, and lowering a temperature of resin within the molding die.

In the resin melting device disclosed in Patent Literature 1, however, only a resin material in a squeezing portion, which is a portion immediately before a nozzle communicating with the molding die in a resin flow direction, is heated and molten.

Further, Patent Literature 2 discloses a configuration in which a heater is mounted on a molding die, and fluidity of a resin material injected into the molding die is secured. Thus, it is possible to secure fluidity of a resin material within the molding die, thereby enabling to enhance product quality of a resin product.

CITATION LIST

Patent Literature

Patent Literature 1: Japanese Unexamined Patent Application Publication No. 2014-113699
Patent Literature 2: Japanese Unexamined Patent Application Publication No. 2000-127175

SUMMARY OF INVENTION

However, in the technique disclosed in Patent Literature 2, it is necessary to heat and cool the entirety of the molding die in order to solidify a resin material filled in the molding die. This makes the tact time long, and lowers energy efficiency. In view of the above, there is room for improvement in the technique disclosed in Patent Literature 2 in the aspect of production efficiency.

In view of the above-described problems, an object of the present disclosure is to provide an injection molding device, an injection molding method, and an injection molding resin material, which enable to manufacture a high-quality resin product by securing high fluidity of a resin material within a molding die, and enable to reduce the production cost.

An injection molding device according to one aspect of the present disclosure includes: an injection machine which injects a resin material in which a dielectric heat generating material is mixed, while keeping fluidity by temperature control; a molding die which includes a cavity being a channel of flow of the resin material, and a pair of electrodes, each of which faces the cavity, the pair of electrodes being disposed to sandwich the resin material therebetween in a direction crossing a direction of the flow; and a high frequency oscillation device which applies a high frequency alternate-current voltage to the pair of electrodes.

DESCRIPTION OF EMBODIMENTS

In the following, an embodiment is described with reference to the drawings. The following description describes one aspect of the present invention. The present invention is not limited by the following configuration except for an essential configuration thereof.

Embodiment

1. Configuration of Injection Molding Device

A configuration of an injection molding device 1 according to the present embodiment is described with reference to FIG. 1.

Figure 1:
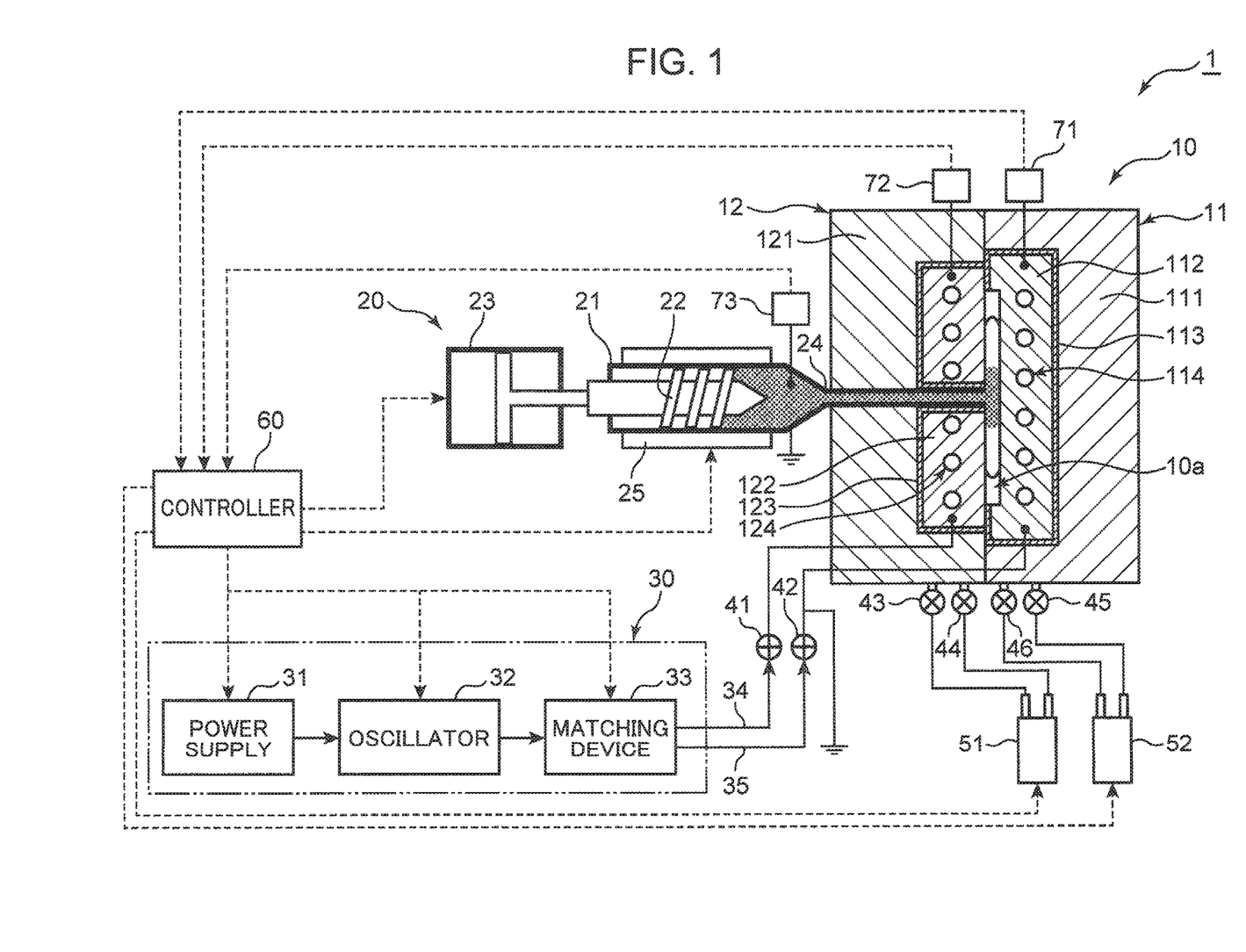
FIG. 1 is a schematic diagram illustrating a configuration of an injection molding device according to an embodiment.

As illustrated in FIG. 1, the injection molding device 1 according to the present embodiment includes a molding die 10, an injection unit (injection machine) 20, a high frequency oscillation unit (high frequency oscillation device) 30, and a controller 60.

The molding die 10 includes a movable die 11 and a fixed die 12, and a cavity 10a is formed between the movable die 11 and the fixed die 12. The movable die 11 can be mold clamped to and separated from the fixed die 12 by an unillustrated driving mechanism.

The movable die 11 includes a die body 111 made of a metal material, an electrode 112 mounted on the die body 111 in such a way as to face the cavity 10a, and an insulator 113 interposed between the die body 111 and the electrode 112. A cooling pipe 114 through which coolant (cooling medium) flows is embedded in the electrode 112.

The fixed die 12 includes a die body 121 made of a metal material, an electrode 122 mouthed on the die body 121 in such a way as to face the cavity 10a, and an insulator 123 interposed between the die body 121 and the electrode 122. A cooling pipe 124 through which coolant (cooling medium) flows is embedded in the electrode 122.

The electrode 112 and the electrode 122 are disposed in such a way as to face each other and to sandwich in the cavity 10a between. And, the insulator 113 or the insulator 123 is sandwiched between the electrode 112 and the electrode 122 in a state that the movable die 11 is mold clamped to the fixed die 12.

Each of the insulator 113 and the insulator 123 is made of a silicate binder or ceramics, for example.

The injection unit 20 includes a cylinder 21, a screw 22, an injection cylinder 23, a nozzle 24, and a cylinder heater 25. The nozzle 24 communicates with the cavity 10a of the molding die 10. A resin material supplied from a hopper (not illustrated) into the cylinder 21 is fluidized by heat from the cylinder heater 25, and injected into the cavity 10a through the nozzle 24, as the screw 22 is advanced by driving of the injection cylinder 23.

Note that the cylinder 21 is grounded.

The high frequency oscillation unit 30 is a unit which applies a high frequency alternate-current voltage between the electrode 112 and the electrode 122, and includes a power supply 31, an oscillator 32, a matching device 33, and power supply lines 34 and 35. In the present embodiment, a frequency of a high frequency alternate-current voltage to be generated between the electrodes 112 and 122 by the high frequency oscillation unit 30 is set to 27 MHz, as one example.

Here, an earth leakage circuit breaking valve 41 is disposed at a midway of a power supply path of the power supply line 34, and an earth leakage circuit breaking valve 42 is disposed at a midway of a power supply path of the power supply line 35. Further, a portion of the power supply line 35 close to the electrode 112 with respect to the location where the earth leakage circuit breaking valve 42 is disposed is grounded.

The controller 60 executes driving control of the injection cylinder 23 and the cylinder heater 25, control of the high frequency oscillation unit 30, and the like. The controller 60 is configured to include a computer provided with a CPU, various programs to be executed on the CPU (including a basic control program such as an OS, and various application programs activated on the OS for executing a specific function), and a memory such as a ROM and a RAM which stores a program and various pieces of data, for example, although detailed illustration thereof is omitted.

Further, coolant circulation units (cooling medium supply devices) 51 and 52, which circulate coolant (cooling medium) to the cooling pipes 114 and 124, are connected to the injection molding device 1. Earth leakage circuit breaking valves 45 and 46 are disposed in coolant circulation channels between the coolant circulation unit 52 and the movable die 11, and earth leakage circuit breaking valves 43 and 44 are disposed in coolant circulation channels between the coolant circulation unit 51 and the fixed die 12.

Furthermore, the injection molding device 1 includes a temperature sensor 71 for detecting a temperature of the electrode 112, a temperature sensor 72 for detecting a temperature of the electrode 122, and a temperature sensor 73 for detecting a temperature of a resin material within the cylinder 21. The temperature sensors 71 to 73 successively output, during driving of the injection molding device 1, detected temperature data to the controller 60. And, the controller 60, which has received the temperature data, feedback controls the cylinder heater 25 and the high frequency oscillation unit 30 using the data.

Figure 2:
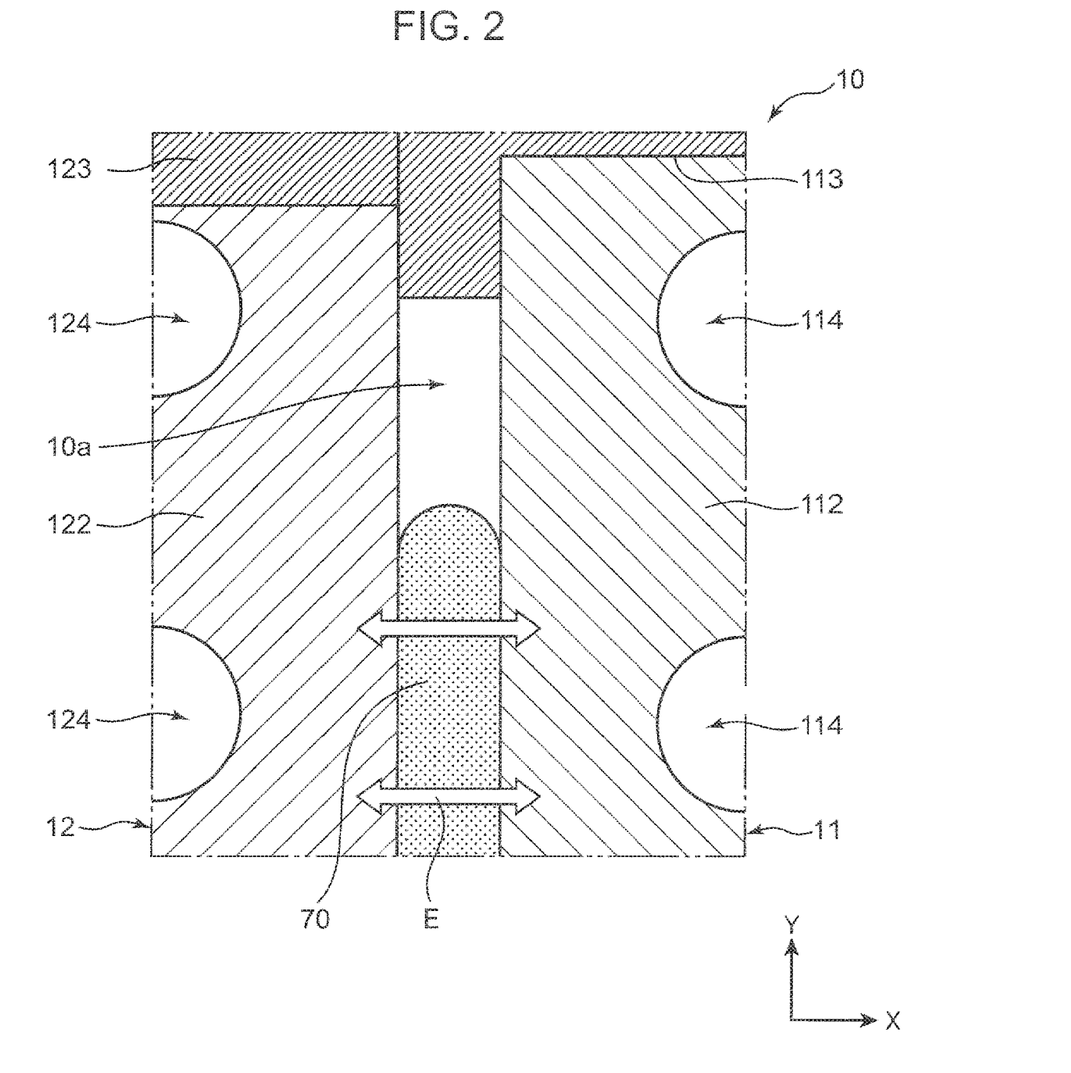
FIG. 2 is a schematic cross-sectional view illustrating a part of a configuration of a molding die.

2. Application of High Frequency Alternate-Current Voltage E to Resin Material 70 Introduced into Cavity 10a An application of a high frequency alternate-current voltage E to a resin material 70 introduced into the cavity 10a is described with reference to FIG. 2. FIG. 2 is a schematic cross-sectional view enlargedly illustrating apart of a configuration of the molding die 10.

First, the resin material 70 for use in the injection molding device 1 according to the present embodiment is a resin material in which a dielectric heat generating material is mixed. Details of the resin material 70 will be described later.

As described above, the electrode 112 and the electrode 122 are formed in such a way as to face the cavity 10a. Therefore, the high frequency alternate-current voltage E is applied to the resin material 70, which is introduced into the cavity 10a and flows within the cavity 10a, as illustrated by the arrows.

Since a dielectric heat generating material is mixed in the resin material 70, the resin material 70 is heated when the high frequency alternate-current voltage F is applied to the resin material 70. Therefore, fluidity of the resin material 70 within the cavity 10a is retained in a state that the high frequency alternate-current voltage E is applied.

3. Configuration of Cavity 10a

Figure 3:
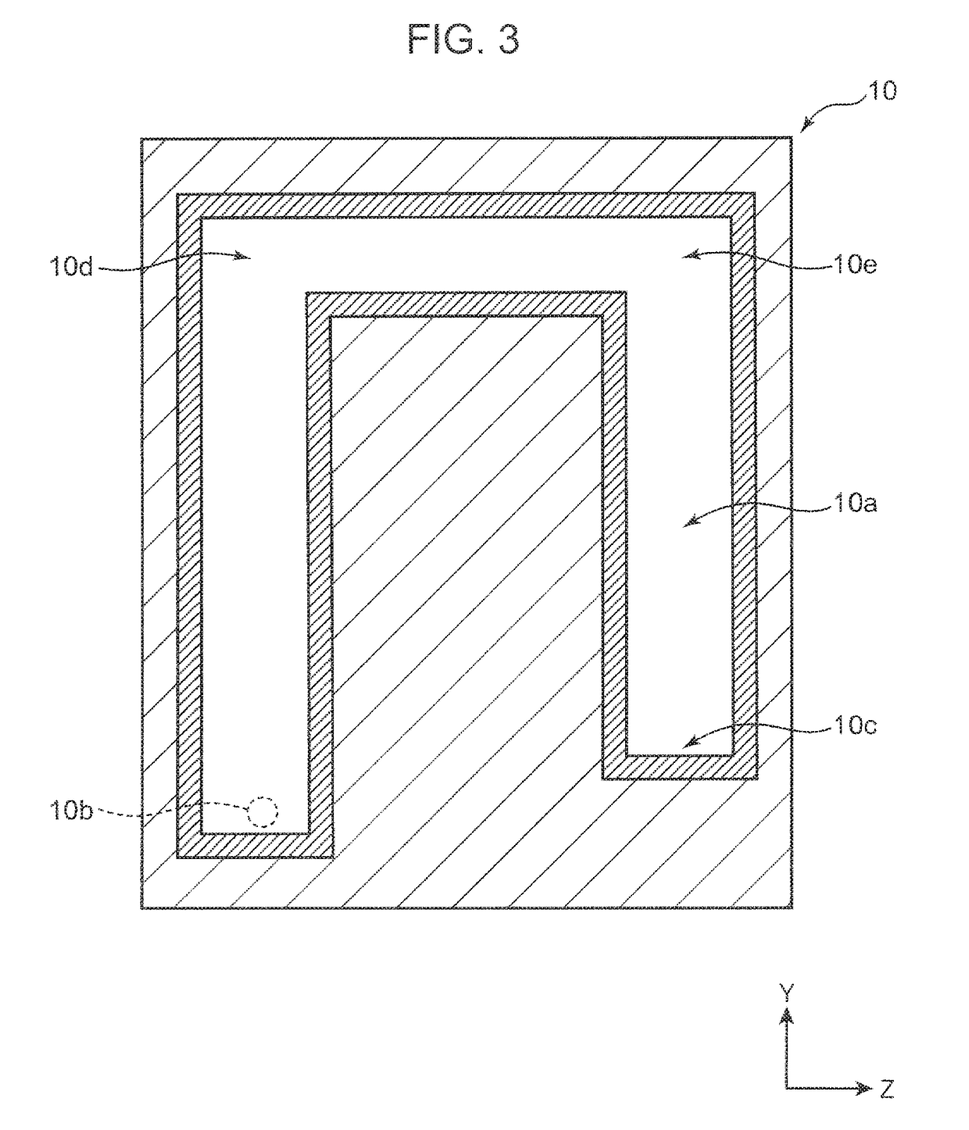
FIG. 3 is a schematic diagram illustrating a configuration of a cavity formed in the molding die.

A configuration of the cavity 10a formed in the molding die 10 is described with reference to FIG. 3. FIG. 3 is a schematic diagram illustrating a configuration of the cavity 10a formed in the molding die 10.

As illustrated in FIG. 3, in the injection molding device 1 according to the present embodiment, as one example, a shape of the cavity 10a of the molding die 10 is a substantially U-shape in a plan view, wherein the cavity 10a has two bent portions 10d and 10e between a flow start portion 10b and a flow end portion 10c.

The resin material 70, which is injected through the nozzle 24 of the injection unit 20, flows from the flow start portion 10b to the flow end portion 10e via the bent portions 10d and 10e.

Here, although detailed illustration is omitted, in the molding die 10, the electrodes 112 and 122 extend over the entire area of a flow channel of the resin material 70 from the flow start portion 10b to the flow end portion 10c. Specifically, it is configured such that the high. frequency alternate-current voltage E can be applied to the resin material 70 flowing in the cavity 10a of the molding die 10 from the flow start portion 10c until the flow end portion 10c.

4. Application of High Frequency Alternate-Current Voltage E to Resin Material 70, and Principle of Heat Generation of Resin Material 70

Figure 4:
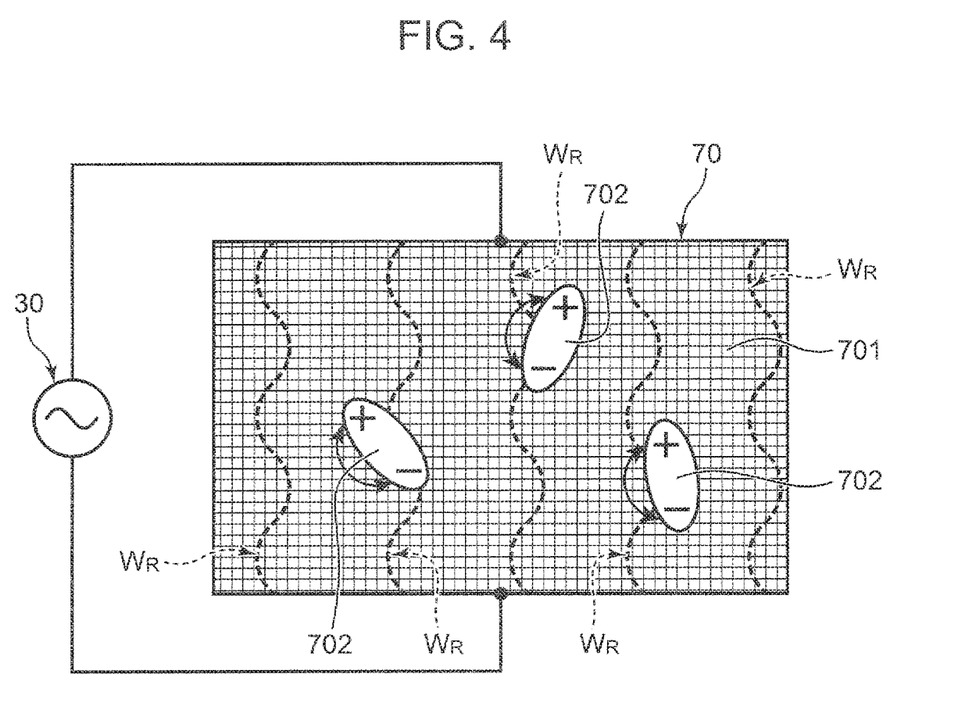
FIG. 4 is a schematic diagram g a principle as to how a resin material is heated.

An application of the high frequency alternate-current voltage E to the resin material 70, and a principle of a heat generation of the resin material 70 is described with reference to FIG. 4. FIG. 4 is a schematic diagram illustrating a principle of the heat generation of the resin material 70.

As illustrated in FIG. 4, the resin material 70 for use in the injection molding device 1 according to the present embodiment is a resin material such that a dielectric heat generating material 702 is mixed in a base material 701. As one example of the base material 701, it is possible to employ thermoplastic resin such as polyolefin resin or polyamide resin.

As one example of the dielectric heat generating material 702, it is possible to employ a resin material having a structure formed by polymerizing polyolefin monomer or polyamide monomer, and polyether monomer. A detailed structure of the resin material 70 will be described later.

As illustrated in FIG. 4, when the high frequency alternate-current voltage E is applied to the resin material 70 by the high frequency oscillation unit 30, an electromagnetic wave WR propagates through the resin material 70. When the electromagnetic wave WR propagates through the resin material 70, the dielectric heat generating material 702 which is mixed in the resin material 70 is heated by deformation (motion) of a molecular chain by the electromagnetic wave WR, and the heat of the dielectric heat generating material 702 is transmitted to the base material 701.

By the above-described principle, the resin material 70 within the cavity 10a is heated by application of the high frequency alternate-current voltage E.

5. Injection Molding Method

Figure 5:
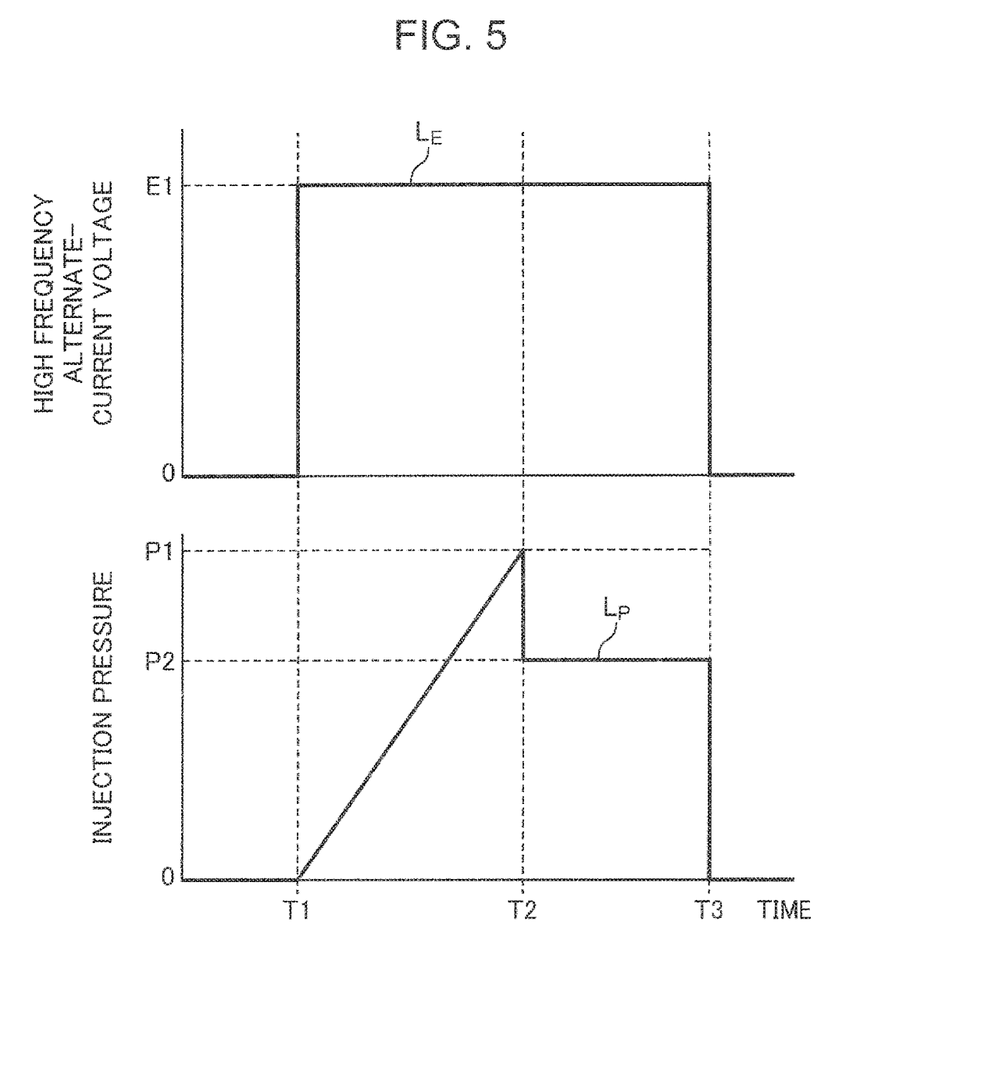
FIG. 5 is a time chart illustrating a control pattern on a high frequency voltage and an injection pressure to be applied by a controller of the injection molding device.
Figure 6:
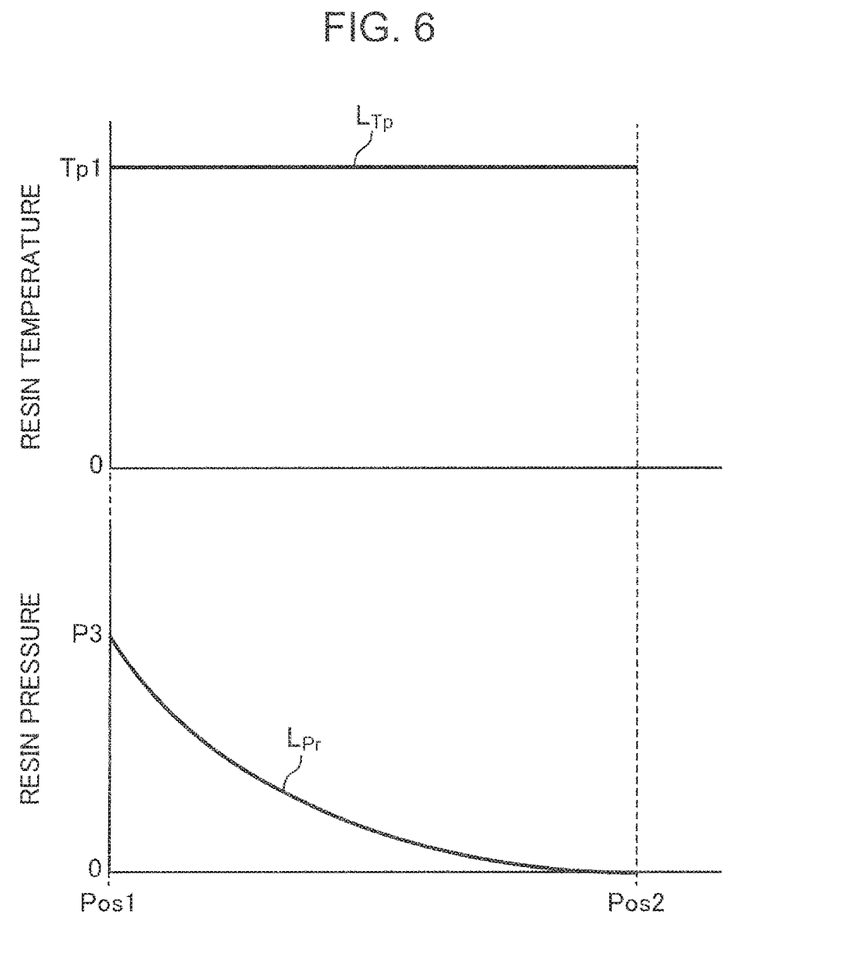
FIG. 6 is a schematic diagram illustrating a temperature and a pressure of the resin material within the molding die when injection is performed.
Figure 7:
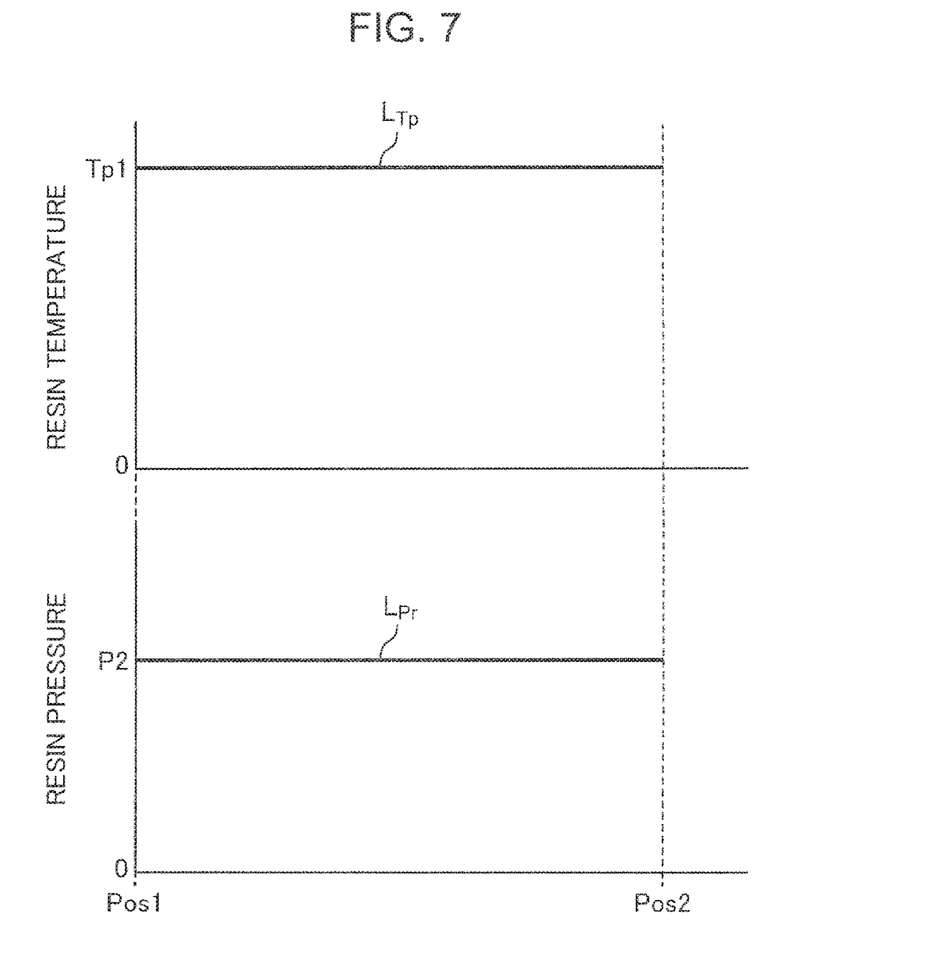
FIG. 7 is a schematic diagram illustrating a temperature and a pressure of the resin material within the molding die when the pressure is retained.

An injection molding method using the injection molding device 1 is described with reference to FIGS. 5 to 7. FIG. 5 is a time chart illustrating an application timing of a high frequency alternate-current voltage and an injection pressure to be applied by the controller 60 in injection molding using the injection molding device 1 with respect to time. FIG. 6 is a characteristic diagram illustrating a temperature and a pressure of the resin material 70 within the cavity 10a, when injection is performed. FIG. 7 is a characteristic diagram illustrating a temperature and a pressure of the resin material 70, when the pressure is retained after the resin material 70 is filled in the cavity 10a.

As illustrated in FIG. 5, at a timing T1 when the injection molding device 1 is turned on, the controller 60 instructs the high frequency oscillation unit 30 to apply the high frequency alternate-current voltage F between the electrodes 112 and 122.

Further, at the timing T1, the controller 60 instructs the injection unit 20 to increase an injection pressure LP to P1. By this instruction, the injection pressure LP is increased in such a way as to reach the pressure P1 at a timing T2.

Although illustration is omitted, when injection molding is performed using the injection molding device 1, the controller 60 instructs the cylinder heater 25 to turn on, so that the resin material 70 within the cylinder 21 is brought to a fluidized state.

Next, at the timing 12 and thereafter when the interior of the cavity 10a is filled with the resin material 70, the controller 60 instructs the high frequency oscillation unit 30 to retain the high frequency alternate-current voltage F of a predetermined value LE, which is fixed during a period from the timing T1 until the timing T2; and instructs the injection unit 20 to apply a constant injection pressure P2 for a predetermined time until a timing T3.

A period from the timing T2 until the timing T3 illustrated in FIG. 5 is referred to as a pressure retaining period.

Next, as illustrated in FIG. 6, when injection is performed during a period from the timing T1 until the timing T2, a temperature LTp of the resin material 70 is kept at a constant temperature Tp1 at which the resin material 70 has fluidity by application of the high frequency alternate-current voltage E of the predetermined value LE in an entire range from a flow start portion Pos1 (equivalent to the above-described flow start portion 10b) until a flow end portion Pos2 (equivalent to the above-described flow end portion 10c) within the cavity 10a.

On the other hand, when injection is performed during the period from the timing T1 until the timing 12, a pressure LPr of the resin material 70 within the cavity 10a is a pressure P3 at the flow start portion Pos1, and the pressure LPr gradually decreases toward the flow end portion Pos2.

Next, as illustrated in FIG. 7, during the pressure retaining period from the timing T2 until the timing 13, the temperature LTp of the resin material 70 within the cavity 10a is kept at the temperature Tp1, since application of the high frequency alternate-current voltage E of the predetermined value LE is continued. Further, during the pressure retaining period from the timing T2 until the timing T3, the pressure LPr of the resin material 70 within the cavity 10a is substantially kept at the constant pressure P2 in the entire range from the flow start portion Pos1 until the flow end portion Pos2 within the cavity 10a, since driving of the injection unit 20 is continued.

6. Configuration of Resin Material 70

Figure 8:
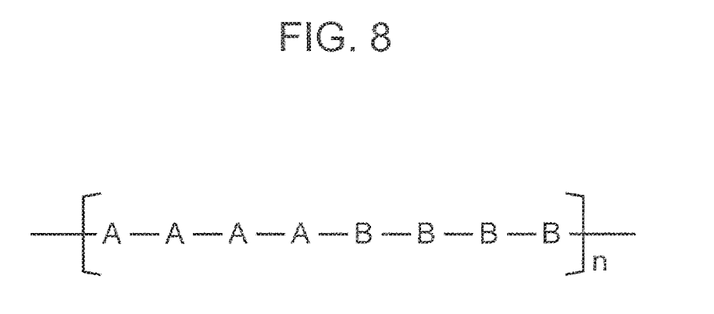
FIG. 8 is a chemical formula of a dielectric heat generating material.

As described above, in the injection molding device 1 according to the present embodiment, the resin material 70 containing the base material 701 and the dielectric heat generating material 702 is used. A composition of the resin material 70 is described with reference to FIG. 8. FIG. 8 is a chemical formula of the dielectric heat generating material 702.

First, the following two types are proposed as the resin material 70.

(1) First Type

<Base Material 701>

Polyolefin resin selected from among HIPS (high impact polystyrene), PP (polypropylene), LDPE (low-density polyethylene), HDPE (high-density polyethylene), m-PPE (modified polyphenylene ether), and PMMA (acryl)

<Dielectric Heat Generating Material 702>

In a chemical formula illustrated in FIG. 8, A represents polyolefin monomer, and B represents polyether monomer. As the first type, the dielectric heat generating material 702, which is a resin material formed by polymerizing polyolefin monomer and polyether monomer, and in which cations are held on a polyether moiety, is employed.

(2) Second Type

<Base Material 701>

Polyamide resin selected from among ABS (acrylonitrile/butadiene/styrene copolymer synthetic resin), PC/ABS (polycarbonate/acrylonitrile/butadiene/styrene mixed resin), PC (polycarbonate), POM (polyacetal), PA6 (polyamide 6), PA12 (polyamide 12), and PA66 (polyamide 66)

<Dielectric Heat Generating Material 702>

In the chemical formula in FIG. 8, A represents polyamide monomer, and B represents polyether monomer. In the second type, the dielectric heat generating material 702, which is a resin material formed by polymerizing polyamide monomer and polyether monomer, and in which cations are held on a polyether moiety, is employed.

Figure 9A:
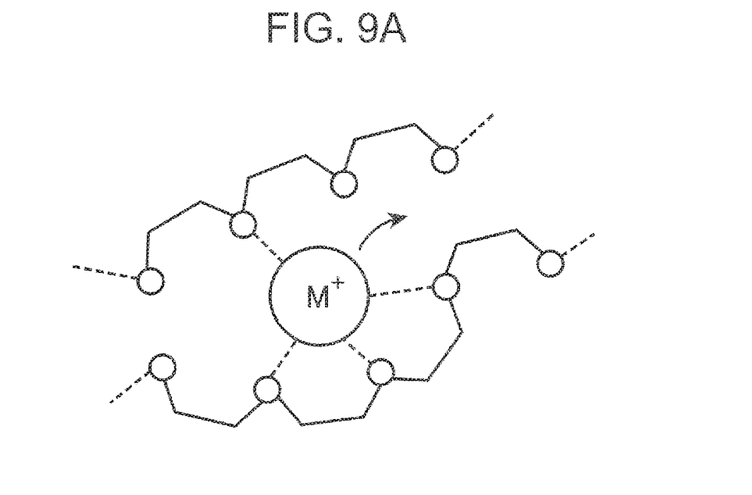
FIG. 9A is a schematic diagram illustrating a state of the dielectric heat generating material before a cation migrates.
Figure 9B:
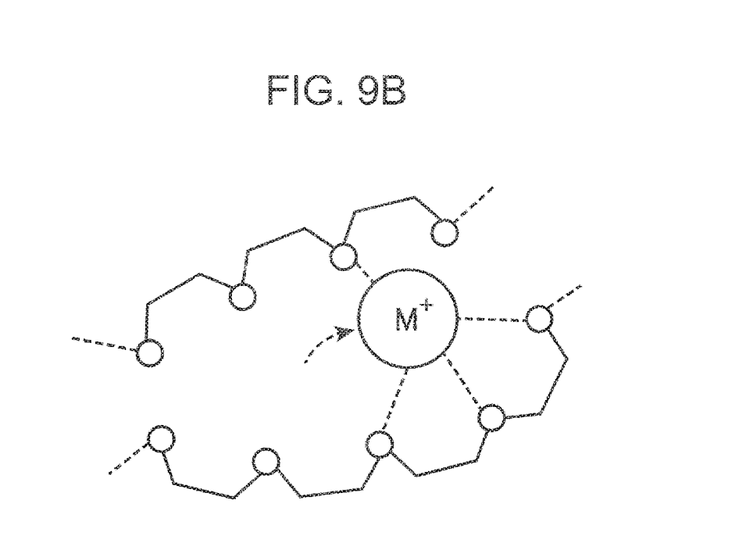
FIG. 9B is a schematic diagram illustrating a state of the dielectric heat generating material after the cation migrates.

7. Heat Generation of Dielectric Heat Generating Material 702 by Application of High Frequency Alternate-Current Voltage E A heat generating mechanism of the resin material 70 by application of the high frequency alternate-current voltage E is described with reference to FIGS. 9A and 9B. FIG. 9A is a schematic diagram illustrating a state of the dielectric heat generating material 702 immediately after application of the high frequency alternate-current voltage E is started. FIG. 9B is a schematic diagram illustrating a state after a cation M+ of the dielectric heat generating material 702 migrates by application of the high frequency alternate-current voltage E.

When the high frequency alternate-current voltage E is applied to the resin material 70 containing the dielectric heat generating material 702, the electromagnetic wave WR also propagates to the dielectric heat generating material 702 (see FIG. 4), and a cation M+, which is present at a position illustrated in FIG. 9A, migrates as illustrated in FIG. 9B.

When the cation M+ migrates from the position illustrated in FIG. 9A to a position illustrated in FIG. 9B, a molecular chain of the dielectric heat generating material 702 is deformed (moves). Therefore, the dielectric heat generating material 702 generates heat, and the heat is transmitted to the base material 701.

Temperature of the resin material 70 for use in injection molding of the injection molding device 1 according to the present embodiment increases due to application of the high frequency alternate-current voltage F, and fluidity thereof is retained.

[Modifications]

In the above embodiment, a thermoplastic resin material is employed as one example of the resin material 70. The technique according to the present disclosure, however, is not limited to the above. A thermoset resin material may be employed. When a thermoset resin material is injected, a high frequency alternate-current voltage may be applied in curing the resin material.

Further, in the above embodiment, fluidity of the resin material 70 flowing within the cavity 10a is retained by dielectric heating. Thus, one injection unit 20 is connected to the molding die 10. The technique according to the present disclosure, however, is not limited to the above. It is possible to retain a temperature of a resin material flowing within a cavity to a substantially same value in the entire region of the cavity. Hence, even when two or more injection units are connected, a hairline defect is hard to occur, and it is possible to provide an enhanced external appearance.

Furthermore, in the above embodiment, the molding die 10 is constituted by combining one fixed die 12 and one movable die 11. The technique according to the present disclosure, however, is not limited to the above. For example, it is possible to employ a molding die constituted by combining three or more dies.

Moreover, in the above embodiment, the pair of electrodes 112 and 122 are disposed in a region from the flow start portion 10b to the flow end portion 10c of the cavity 10a in the molding die 10. The technique according to the present disclosure, however, is not limited to the above. For example, a plurality of pairs of electrodes may be disposed to be away from one another in a flow direction of a resin material within a cavity.

In addition, an electrode pair may not be disposed at a location where electric discharge in air is likely to occur due to a shape of a cavity, and the like.

[Overview of Present Disclosure]

An injection molding device according to one aspect of the present disclosure includes: an injection machine which injects a resin material in which a dielectric heat generating material is mixed, while keeping fluidity by temperature control; a molding die which includes a cavity being a channel of flow of the resin material, and a pair of electrodes, each of which faces the cavity, the pair of electrodes being disposed to sandwich the resin material therebetween in a direction crossing a direction of the flow; and a high frequency oscillation device which applies a high frequency alternate-current voltage between the pair of electrodes.

In the injection molding device according to the above aspect, a resin material, in which a dielectric heat generating material is mixed, is used as the resin material to be injected, and the pair of electrodes, each of which faces the cavity, are provided and a high frequency alternate-current voltage is applied between the pair of electrodes. Therefore, in the injection molding device according to the above aspect, it is possible to control application of a high frequency alternate-current voltage to the resin material injected from the injection machine, and flowing within the cavity. High fluidity is secured for the resin material by application control of a high frequency alternate-current voltage.

When, a resin material, in which a base material is thermoplastic, is used as the resin material to be injected, the dielectric heat generating material generates heat by applying a high frequency alternate-current voltage to the resin material flowing in the cavity. This enables to secure fluidity of the resin material.

On the other hand, when a resin material, in which a base material is thermoset, is used as the resin material to be injected, it is possible to cure the resin material with generated heat of the dielectric heat generating material by applying a high frequency alternate-current voltage in a state that the cavity is filled with the resin material.

Further, in the injection molding device according to the above aspect, fluidity is secured not by heating the entirety of the molding die, but by temperature control of the resin material flowing within the cavity. Hence, it is possible to reduce energy loss, and to solidify the resin material only by application control of a high frequency alternate-current, voltage after the cavity is filled with the resin material. Accordingly, as compared with a case of temperature control of the entirety of the molding die, it is also possible to shorten the tact time.

Therefore, in the injection molding device according to the above aspect, it is possible to manufacture a high-quality resin product and to reduce the production cost, by securing high fluidity of the resin material within the molding die.

In the above aspect, an injection molding device according to another aspect of the present disclosure is such that the molding die includes a fixed die and a movable die, each of which has a die body and which fit into each other, and that one of the pair of electrodes is mounted on the die body of the fixed die via an insulator, and another of the pair of electrodes is mounted on the die body of the movable die via an insulator.

In the injection molding device according to the above aspect, an electrode is mounted on each of the fixed die and the movable die in a state that an insulator is sandwiched between the electrode and a die body. Hence, it is possible to suppress leakage of an electromagnetic wave to the outside of the die, when a high frequency alternate-current voltage is applied.

In the above aspect, an injection molding device according to another aspect of the present disclosure is such that at least one of the pair of electrodes has a cooling channel through which a cooling medium passes, and the injection molding device further includes a cooling medium supply device which supplies the cooling medium to the cooling channel.

In the injection molding device according to the above aspect, since the electrode has a cooling channel, even when heat of the resin material by dielectric heat generation is transmitted to the electrode, it is possible to cool the electrode by supply of a cooling medium, Therefore, in the injection molding device according to the above aspect, it is possible to more accurately perform temperature control of the resin material flowing within the cavity, to cool the resin material and the molding die by supply of the cooling medium in solidifying the resin material and taking the resin material from the molding die, and to shorten the tact time. Therefore, the injection molding device according to the above aspect is advantageous in achieving higher productivity.

In the above aspect, an injection molding device according to another aspect of the present disclosure is such that the pair of electrodes are formed from an upstream end of the cavity until a downstream end of the cavity in the direction of the flow.

In the injection molding device according to the above aspect, the pair of electrodes are formed from an upstream end of the cavity until a downstream end of the cavity in the direction of the flow of the resin material. Hence, it is possible to control a temperature of the resin material in the entire area of the cavity.

In the above aspect, an injection molding device according to another aspect of the present disclosure further includes a controller which is configured to control injection of the resin material from the injection machine, and to control application of the high frequency alternate-current voltage by means of the high frequency oscillation device. The controller is configured to control the injection machine to continue to apply an injection pressure to an interior of the cavity for a predetermined time, after an entirety of the cavity is filled with the resin material.

In the injection molding device according to the above aspect, a pressure retaining period (the above-described predetermined time) is secured after the cavity is filled with the resin material. Hence, it is possible to make a pressure of the resin material in the entire area of the cavity uniform for a period until the resin material is solidified. Therefore, in the injection molding device according to the above aspect, it is possible to make shrinkage of the resin material at solidification uniform in the entire area of the cavity. This is advantageous in manufacturing a high-quality resin product.

An injection molding method according to one aspect of the present disclosure includes: an injection step of injecting a resin material in which a dielectric heat generating material is mixed, while keeping fluidity by temperature control; a flowing step of flowing the resin material injected in the injection step within a cavity formed within a molding die; and a high frequency alternate current voltage application step of applying a high frequency alternate-current voltage to the resin material flowing within the cavity.

In the injection molding method according to the above aspect, a resin material in which a dielectric heat generating material is mixed is used as the resin material to be injected, and in the high frequency alternate-current voltage application step, a high frequency alternate-current voltage is applied to the resin material flowing within the cavity. Therefore, in the injection molding method according to the above aspect, it is possible to secure high fluidity of the resin material by application control of a high frequency alternate-current voltage by performing application control of the high frequency alternate-current voltage to the resin material injected from an injection machine and flowing within the cavity.

Similarly to the above, when a resin material, in which a base material is thermoplastic, is used as the resin material to be injected, the dielectric heat generating material generates heat by applying a high frequency alternate-current voltage to the resin material flowing in the cavity. This enables to secure fluidity of the resin material.

On the other hand, when a resin material, in which a base material is thermoset, is used as the resin material to be injected, it is possible to cure the resin material with generated heat of the dielectric heat generating material by applying a high frequency alternate-current voltage in a state that the cavity is filled with the resin material.

Further, in the injection molding method according to the above aspect, fluidity of the resin material is secured not by heating the entirety of the molding die, but by temperature control of the resin material flowing within the cavity in the high frequency alternate-current voltage application step. Hence, it is possible to reduce energy loss, and to solidify the resin material only by application control of a high frequency alternate-current voltage after the cavity is filled with the resin material. Accordingly, as compared with a case of temperature control of the entirety of the molding die, it is also possible to shorten the tact time.

Therefore, in the injection molding method according to the above aspect, it is possible to manufacture a high-quality resin product and to reduce the production cost, by securing high fluidity of the resin material within the molding die.

In the above aspect, an injection molding method according to another aspect of the present disclosure is such that, in the high frequency alternate-current voltage application step, the high frequency alternate-current voltage is applied to the resin material flowing from an upstream end of the cavity until a downstream end of the cavity in a direction of the flowing.

In the injection molding method according to the above aspect, the pair of electrodes are formed from an upstream end of the cavity until a downstream end of the cavity in the direction of the flow of the resin material. Hence, it is possible to control a temperature of the resin material in the entire area of the cavity in the high frequency alternate-current voltage application step.

In the above aspect, an injection molding method according to another aspect of the present disclosure further includes a pressure retaining step of continuing to apply an injection pressure to an interior of the cavity for a predetermined time, after the injection step, an entirety of the cavity having been filled with the resin material in the injection step.

In the injection molding method according to the above aspect, since the pressure retaining step is included, it is possible to make a pressure of the resin material in the entire area of the cavity uniform for a period after the cavity is filled with the resin material until the resin material is solidified. Therefore, in the injection molding method according to the above aspect, it is possible to make shrinkage of the resin material at solidification uniform in the entire area of the cavity. This is advantageous in manufacturing a high-quality resin product.

In the above aspect, an injection molding method according to another aspect of the present disclosure further includes a cooling step of, after the pressure retaining step is performed, cooling the resin material, with which the cavity is filled, by supplying a cooling medium to a cooling channel formed within the molding die.

In the injection molding method according to the above aspect, since the cooling step is included, even when heat of the resin material by dielectric heat generation is transmitted to the electrode, it is possible to cool the electrode by performing the cooling step. Therefore, in the injection molding method according to the above aspect, it is possible to more accurately perform temperature control of the resin material flowing within the cavity, to cool the resin material and the molding die by supply of the cooling medium in solidifying the resin material and taking the resin material from the molding die, and to shorten the tact time. Therefore, the injection molding method according to the above aspect is advantageous in achieving higher productivity.

An injection molding resin material according to one aspect of the present disclosure is an injection molding resin material to be supplied to the injection molding device according to any one of the above-described aspects, wherein the resin material includes: a base material containing polyolefin resin or polyamide resin; and a dielectric heat generating material in which a cation is migratable by application of the high frequency alternate-current voltage.

The resin material according to the above aspect contains a dielectric heat generating material in which a cation migrates (moves) by an electromagnetic wave propagating through the resin material by application of the high frequency alternate-current voltage. Therefore, when injection molding is performed using the resin material according to the above aspect, a cation in the dielectric heat generating material migrates (moves) by application of the high frequency alternate-current voltage to the resin material with which the cavity is filled. Thus, in the resin material according to the above aspect, fluidity of the base material is controlled by the heat generated in the dielectric heat generating material, and it is advantageous in manufacturing a high-quality resin product.

Further, in the resin material according to the above aspect, by containing the dielectric heat generating material having the above configuration, it is possible to control fluidity of the resin material not by heating the entirety of the molding die, but only by applying the high frequency alternate-current voltage to the resin material. Therefore, the resin material according to the above aspect is able to be molded with enhanced heat efficiency in injection molding, and is also advantageous in shortening the tact time.

In the injection molding resin material according to another aspect of the present disclosure, polyolefin resin selected from among FHPS, PP, LDPE, HDPE, m-PPE, and PMMA may be employed as a specific example of the base material, and a resin material formed by polymerizing polyolefin monomer and polyether monomer may be employed as a specific example of the dielectric heat generating material. The dielectric heat generating material may be such that the cation is held in the polyether moiety.

Further, in the injection molding resin material according to another aspect of the present disclosure, polyamide resin selected from among ABS, PC/ABS, PC, POM, PA6, PA12, and PA66 may be employed as a specific example of the base material, and a resin material formed by polymerizing polyamide monomer and polyether monomer may be employed as a specific example of the dielectric heat generating material. The dielectric heat generating material may be such that the cation is held in the polyether moiety.

As described above, the technique according to the present disclosure is able to manufacture a high-quality resin product and to reduce the production cost by securing high fluidity of a resin material within a molding die.

The invention claimed is:

1. An injection molding resin material to be supplied to an injection molding device,
the injection molding device including:
an injection machine which injects the supplied injection molding resin material while keeping fluidity by temperature control;
a molding die which includes a cavity being a channel of flow of the injection molding resin material, and a pair of electrodes, each of which faces the cavity, the pair of electrodes being disposed to sandwich the injection molding resin material therebetween in a direction crossing a direction of the flow; and
a high frequency oscillation device which applies a high frequency alternate-current voltage to the pair of electrodes,
the injection molding resin material comprising:
a base material containing resin selected from among HIPS, PP, LDPE, HDPE, m-PPE, and PMMA, and
a dielectric heat generating material containing resin including a plurality of olefin monomers and a plurality of ether monomers that are polymerized, and a cation held in a moiety where the ether monomers are polymerized,
wherein
the cation is migratable by an electromagnetic wave generated in the injection molding resin material by application of the high frequency alternate-current voltage, and
the dielectric heat generating material generates heat as the cation migrates by the electromagnetic wave.

2. An injection molding resin material to be supplied to an injection molding device,
the injection molding device including:
an injection machine which injects the supplied injection molding resin material while keeping fluidity by temperature control;
a molding die which includes a cavity being a channel of flow of the injection molding resin material, and a pair of electrodes, each of which faces the cavity, the pair of electrodes being disposed to sandwich the injection molding resin material therebetween in a direction crossing a direction of the flow; and
a high frequency oscillation device which applies a high frequency alternate-current voltage to the pair of electrodes,
the injection molding resin material comprising:
a base material containing resin selected from among ABS, PC/ABS, PC, POM, PA6, PA12, and PA66, and
a dielectric heat generating material containing resin including a plurality of amide monomers and a plurality of ether monomers that are polymerized, and a cation held in a moiety where the ether monomers are polymerized,
wherein
the cation is migratable by an electromagnetic wave generated in the injection molding resin material by application of the high frequency alternate-current voltage, and
the dielectric heat generating material generates heat as the cation migrates by the electromagnetic wave.

3. The injection molding resin material according to claim 1, wherein
the dielectric heat generating material is dispersedly mixed in the base material.

4. The injection molding resin material according to claim 2, wherein
the dielectric heat generating material is dispersedly mixed in the base material.

* * * * *